United States Patent
Padisetty et al.

(10) Patent No.: US 7,418,306 B2
(45) Date of Patent: Aug. 26, 2008

(54) FRAMEWORK FOR MANAGING PROCESS INCLUDING SEQUENTIAL ACTIONS

(75) Inventors: Sivaprasad V Padisetty, Redmond, WA (US); Thirunavukkarasu Elangovan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/069,854

(22) Filed: Feb. 28, 2005

(65) Prior Publication Data

US 2006/0195210 A1 Aug. 31, 2006

(51) Int. Cl.
*G06F 19/00* (2006.01)

(52) U.S. Cl. ......................................... 700/100; 700/97

(58) Field of Classification Search .................. 700/100, 700/97, 101, 90
See application file for complete search history.

(56) References Cited

U.S. PATENT DOCUMENTS

| | | | | |
|---|---|---|---|---|
| 5,581,691 A | * | 12/1996 | Hsu et al. ..................... | 714/15 |
| 5,745,901 A | * | 4/1998 | Entner et al. ............. | 707/103 R |
| 5,799,297 A | * | 8/1998 | Goodridge et al. ............. | 707/1 |
| 5,867,824 A | * | 2/1999 | Saito et al. ...................... | 705/9 |
| 6,041,306 A | * | 3/2000 | Du et al. ........................ | 705/8 |
| 6,167,316 A | * | 12/2000 | Gloudeman et al. ............ | 700/2 |
| 2004/0260407 A1 | * | 12/2004 | Wimsatt ....................... | 700/19 |
| 2005/0149342 A1 | * | 7/2005 | Chao et al. ..................... | 705/1 |

* cited by examiner

*Primary Examiner*—Zoila E Cabrera
(74) *Attorney, Agent, or Firm*—Christensen O'Connor Johnson Kindness PLLC

(57) ABSTRACT

A generic automation framework is provided to divide a process into a sequence of stages. The stages in the process may depend on each other and this dependency dictates the flow of the process. A stage may be an instance of a stage type, which provides a generic definition of a stage. A stage may be customized according to the specific requirement of the process. A stage may have one or more properties. Such a property may reflect the status of the stage during the progression of the process, identify the owner responsible for proper execution of the stage, and describe an escalation policy that indicates what to do upon the occurrence of a particular event in the stage. A user interface may be provided that separately displays information for each stage. The user interface may also graphically indicate the status of each stage in the process at a given moment.

14 Claims, 10 Drawing Sheets

EDIT STAGE

STAGE TITLE: SUBMISSION — 902

ASSIGNED TO: — 904  ▼  REQUESTED BY: — 906  [908 LAST UPDATED BY:]

STATUS: — 910  ▼  REQUESTED ON: — 912  [914 LAST UPDATED:]

| DEPENDENT/RELATED LINKS — 920 | CUSTOM PLUGIN — 922 | NOTIFICATION — 924 | OVERALL STATUS — 926 |

FRAMEWORK FOR MANAGING PROCESS INCLUDING SEQUENTIAL ACTIONS

FIELD OF THE INVENTION

The present invention relates to computer software and, more particularly, to managing a process or workflow.

BACKGROUND OF THE INVENTION

A process in general contains a sequence of steps, tasks, or activities that convert an input to a desired output. The sequence of activities in a process begins with an input, which can be in a variety of forms such as investment capital, knowledge, physical materials, or software source code. The process can add value to the input by changing it or using it to produce a desired output, such as a product or service of desired value. A process produces a desired product or service by applying resources such as computing power, time, and manpower. The input process may be anything from billing customers, to prosecuting a patent application, to developing and testing a software product. An efficient process enables things to be done faster, cheaper, and/or outputs a better product or service. An efficient process may also use resources more efficiently and effectively.

Among various processes, some processes include a plurality of actions that are to be performed sequentially. For example, a software testing process may include sequential actions such as submitting source code to be tested, reviewing the submitted source code, performing various tests on the submitted source code, and checking the tested source code into a source code control system that controls and tracks changes to files.

For a process including sequential actions, it is desirable to divide the process into a sequence of stages, each of which includes one or more sequential actions in the process. The stages are then executed sequentially. It is also desirable that each stage is assigned to an owner, who is then held accountable for the proper performance of the stage. Further, it is desirable to keep track of the progression of the process by identifying the execution status of each stage in the process. Furthermore, it is desirable that each stage in a process is capable of being customized according to specific requirements, such as a user's specific need in performing the process.

Therefore, there exists a need for a mechanism that divides a process into a plurality of stages to be performed sequentially, wherein each stage involves one or more actions of the process. There also exists a need to be able to customize individual stages of the process according to specific requirements of the process. There further exists a need to keep track of the progression of the process by identifying the status of each stage in the process at a given moment.

SUMMARY OF THE INVENTION

The invention addresses the above-identified needs by providing a generic automation framework for any process flow. A process is divided into a sequence of stages. The stages in the process depend on each other, and the dependency dictates the flow of the process. Each stage in the process may be customized according to specific requirements for the process. Preferably, a user interface is provided for creating and defining a plurality of stages in a process. The user interface displays information concerning each stage separately. The user interface may also graphically display the stages in the process and indicate the current status of each stage in the process.

In accordance with one aspect of the invention, a process is divided into a sequence of stages, wherein an execution of the stages takes the process from start to finish. Each stage in the process may depend on other stages in the process. The dependency dictates the flow of the process. A stage is dependent on another stage if the stage can be executed only after another stage has completed. A stage that does not depend on any other stage is the initial stage of the process. An execution of the process starts from the initial stage of the process. The successful execution of the initial stage leads to the activation of its immediate dependent stage(s), the successful execution of which leads to the activation of their immediate dependent stage(s). If any of the stages in the process fails to perform properly, the process is re-executed.

Another aspect of the invention predefines one or more stage types, each of which provides a general definition of a stage. A stage in a process is an instance of a specific stage type. Preferably, a stage, i.e., an instance of a stage type, may be customized to meet specific requirements for a process. Preferably, the stage type of a stage includes one or more properties that provide information about customization of a stage, such as the name and the location of the customization files.

In accordance with yet another aspect of the invention, a stage is associated with one or more properties such as status, owner, and an escalation policy. The status property identifies the status of the stage, which can be "active," "waiting," "resolved," or "closed." The owner property identifies the individual or group of individuals who are responsible for the proper execution of the stage. The escalation policy indicates what to do upon the occurrence of a particular event in the stage. For example, dependent stages of the stage may be notified upon the status of the stage being transitioned to "closed."

A further aspect of the invention provides a user interface for creating and managing a plurality of stages in a process. The user interface allows a user to edit information concerning each stage in a process in a separate portion of the user interface. Each such separate portion of the user interface supplies information concerning properties of a stage, the dependency relationships between the stage and other stages in the process, plug-ins that customize the stage, the escalation policy of the stage, etc. Preferably, the user interface also graphically indicates the status of each stage in a process at a given moment, wherein the stages may be displayed in different colors according to their statuses. The user interface may also display a custom UI control that pre-defines a plurality of stages for a process.

In summary, the invention provides a generic automation framework for any process including sequential actions. The generic automation framework defines a plurality of stages for the process and automatically executes the plurality of stages sequentially. The generic automation framework thus eliminates possible manual interventions of a process. The generic automation framework also provides accountability by assigning owners to stages in a process and tracking the status of each stage during progression of the process.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 9 is a pictorial diagram illustrating the exemplary user interface in FIG. 8, wherein a stage for a process is being edited.

DETAILED DESCRIPTION OF THE PREFERRED EMBODIMENT

Embodiments of the invention divide a process including sequential actions into a plurality of stages. These stages take the process from start to finish. The stages in the process may depend on each other, and this dependency dictates the flow of the process. Preferably, a stage in the process may be an instance of a predefined stage type, which provides a general definition of a stage. A stage may be customized to meet specific requirements of the process by using custom plug-ins. Preferably, a user interface is provided to define and manage a plurality of stages for a process. The user interface may separately display information concerning each stage in the process. The user interface may also graphically indicate the dependency relationships and the status of each stage in the process at a given moment.

In embodiments of the invention, a process is a collective term referring to a series of activities required to obtain a desired result. A process can be anything from creating an encyclopedia, to prosecuting a patent application, to testing a software program. In the following text, the invention will primarily be described in the context of a software testing process. However, those skilled in the relevant art and others will appreciate that the invention is also applicable to any process or workflow that can be divided into a sequence of stages. Such a process or workflow includes, for example, a software development process, a document management process, a business decision-making process, etc.

The following text will first describe a stage and multiple exemplary properties associated with the stage. The following text then describes a schema for customizing a stage, which may be an instance of a predefined stage type. The following text further describes a computer-implemented method for managing a process including sequential actions. The computer-implemented method divides a process into a plurality of stages and defines the dependencies among the plurality of stages. The method adjusts the status of each stage according to the progression of the process. Finally, the following text describes an exemplary user interface for defining a plurality of stages in a process.

Section 1: Stages

Figure 1:
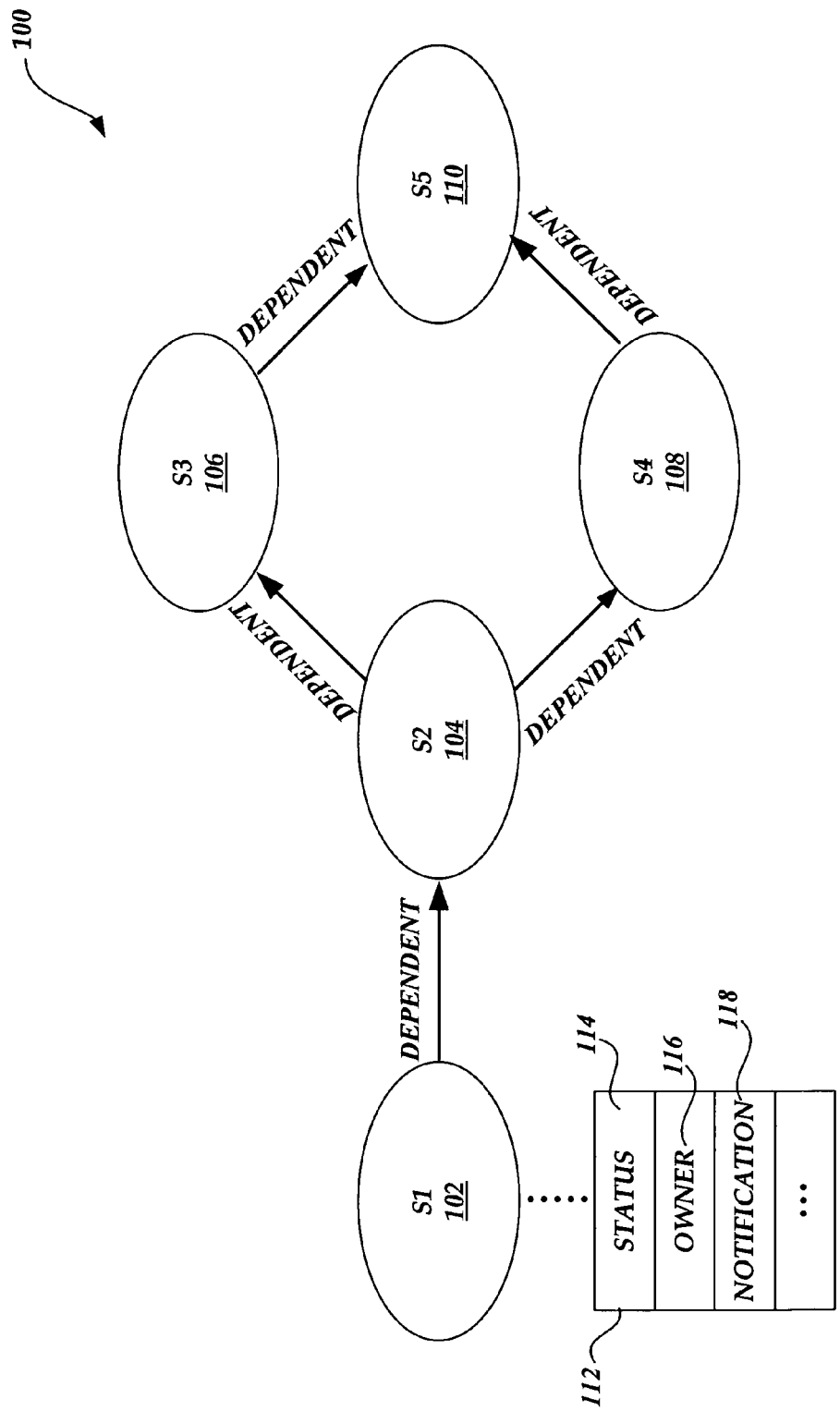
FIG. 1 is a block diagram illustrating an exemplary implementation of the invention.

Embodiments of the invention divide a process including sequential actions into a plurality of stages, each of which may contain one or more sequential actions in the process. For example, FIG. 1 is a block diagram illustrating an exemplary process 100 that includes multiple stages, such as stages S1 (102), S2 (104), S3 (106), S4 (108), and S5 (110). These stages take the process from an initial stage to an exit stage. An initial stage, such as stage S1 (102), is where all stages for a process are created and default owners of the stages are assigned. An exit stage, such as stage S5 (110), is the final stage of the process, where the process ends.

A stage of a process may depend on other stages of the process. A stage is dependent on another stage if the stage can be activated only after another stage completes. For example, as shown in FIG. 1, stage S2 (104) depends on stage S1 (102) because stage S2 (104) can be activated only after stage S1 (102) completes. In embodiments of the invention, a process thus comprises a collection of stages and their dependency relationships.

In exemplary embodiments of the invention, a stage may have a plurality of properties. For example, as shown in FIG. 1, a stage such as stage S1 (102) is associated with properties 112 such as status 114, owner 116, notification 118, etc.

In an exemplary embodiment of the invention, a stage may be in an "active" status, a "waiting" status, or a "closed" status. A stage may transition to the "active" status when the one or more stages that the stage depends on have just transitioned to the "closed" status. A stage has a "closed" status when the stage is completed. Once a stage is closed, its dependent stages in the process flow will be activated. In particular, when a new process is created, the initial stage will have the "active" status while the rest of the stages in the process will have the "waiting" status. When the initial stage of the process transitions to the "closed" status, the immediate next stage will have the "active" status and all the other stages will have the "waiting" status. A stage is in the "waiting" status when at least one of the stages it depends on is not in the "closed" status.

In some embodiments of the invention, a stage may have additional statuses. For example, when a stage is about resolving one or more issues in a process, the stage may have an additional status named "resolved," which comes in between the "active" status and the "closed" status of the stage. When each issue in the stage is resolved, the stage changes from the "active" status to the "resolved" status. While in the "resolved" status, the resolved issue(s) in the stage are verified. When the issue(s) successfully pass the verification, the stage goes into the "closed" status.

Each stage may be assigned to an owner. An owner performs the one or more sequential actions in the stage, and is held accountable for the proper execution of the stage. In embodiments of the invention, a stage can be assigned to more than one owner. In such a situation, multiple instances of the same stage are created so each owner is associated with one instance of the stage. When multiple instances of a stage are created, stages depending on the stage will be in the "waiting" status until all instances of the stage are closed. For example, as shown in FIG. 1, stage S5 (110) will remain in the "waiting" status until both stage S3 (106) and stage S4 (108) are closed. A failure in any of the instances of the stage will initiate a "Pushback" action, which reactivates the initial stage of the process and sets all other stages in the process to the "waiting" status. Thus, for the process 100 illustrated in FIG. 1, any failure in stage S3 (106) or stage S4 (108) will reactivate the initial stage S1 (102) and will reset all other stages in the process 100 to the "waiting" status.

Each stage may also be associated with a notification property, which in essence is an escalation policy. The escalation policy defines the behavior of the stage upon occurrence of a specific event. For example, when the status of a stage is changed to "closed," stages depending on the stage will be notified.

In embodiments of the invention, the status of a stage in a process changes according to the progression of the process. FIGS. 2-5 illustrate an exemplary execution of a software testing process 200, wherein the status of each stage changes according to the progression of the testing process 200.

Figure 2:
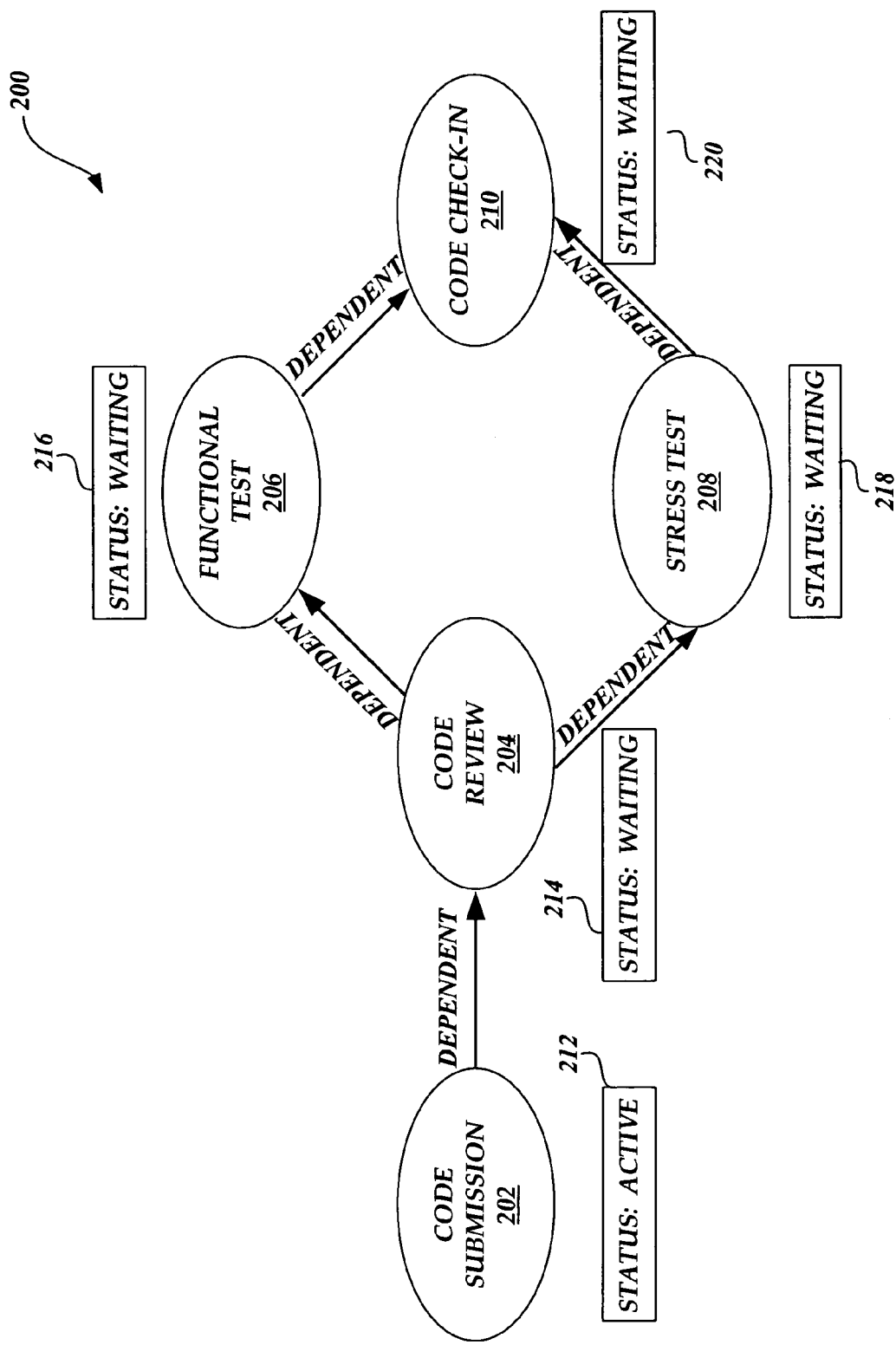
FIG. 2 is a block diagram illustrating a snapshot during the execution of an exemplary process, which is in its initial stage of execution.

As shown in FIGS. 2-5, the testing process 200 comprises a plurality of stages such as a code submission stage 202, a code review stage 204, multiple testing stages such as a functional test stage 206 and a stress testing stage 208, and a code check-in stage 210. FIGS. 2-5 also identify the dependency relationships among the plurality of stages. For example, as shown in FIG. 2, the code review stage 204 depends on the code submission stage 202. The functional test stage 206 and the stress test stage 208 depend on the code review stage 204. The code check-in stage 210 depends on the functional test stage 206 and the stress test stage 208.

As noted above, each stage is assigned to an owner who is responsible for the proper execution of the stage. While the owner of a stage is performing actions in the stage, the stage has an "active" status, and stages depending on the stage have a "waiting" status. In particular, when the initial stage of a process is in the "active" status, all other stages in the process have the "waiting" status. For example, as shown in FIG. 2, when the status 212 of the code submission stage 202 is "active," other stages in the test process 200 are all in the "waiting" status, because the code submission stage 202 is the initial stage of the testing process 200.

Figure 3:
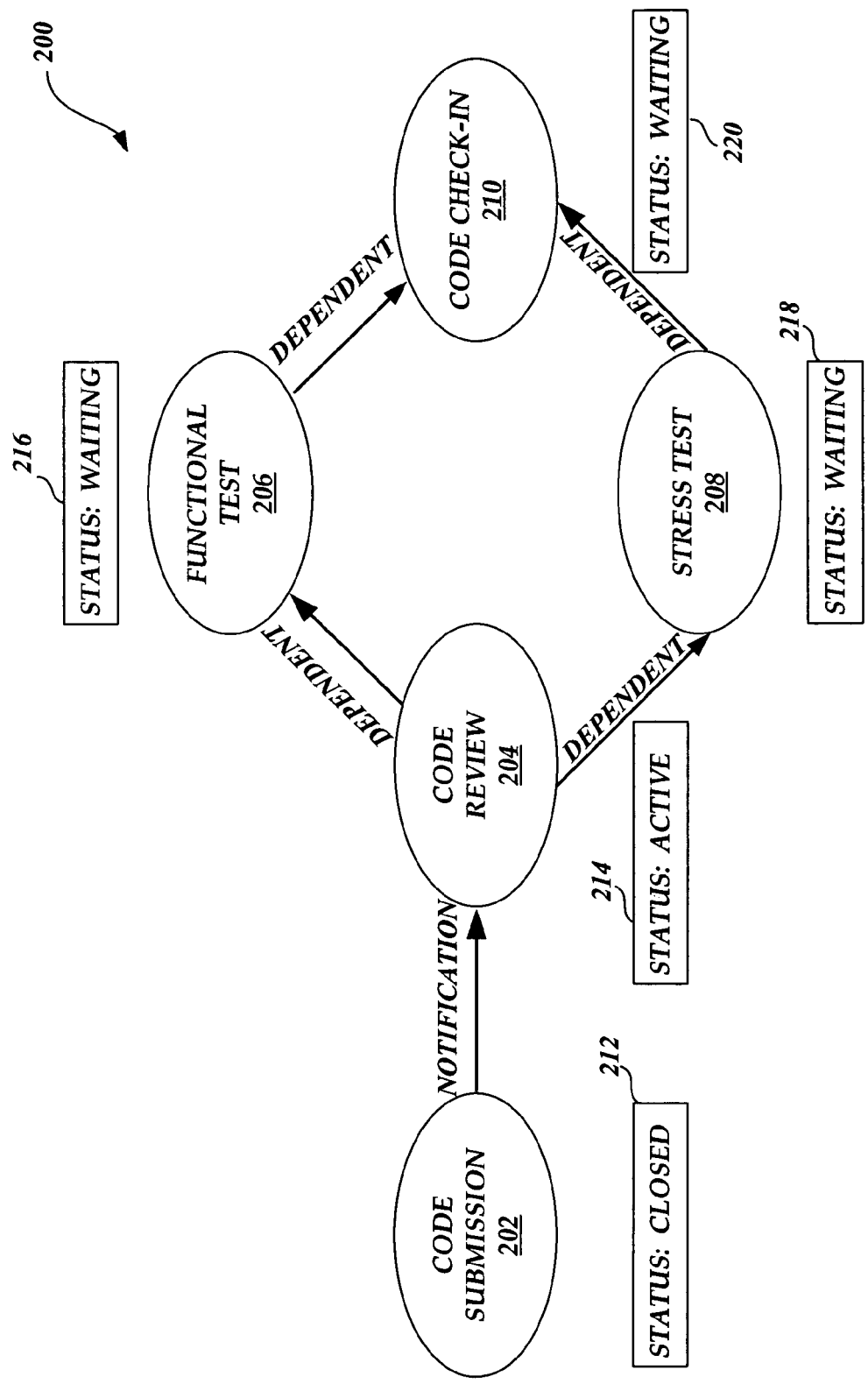
FIG. 3 is a block diagram illustrating another snapshot during the execution of the exemplary process used in FIG. 2, wherein the execution of the exemplary process proceeds to the next stage.

As noted above, in exemplary embodiments of the invention, according to the specification in the escalation policy associated with a stage, the stage notifies its dependent stages upon the occurrence of a particular event. Such an event can be that the stage has transitioned into the "closed" status. For example, as shown in FIG. 3, when the owner of the code submission stage 202 has submitted source code for the test process 200, the status 212 of the code submission stage 202 changes from "active" to "closed." As a result, the code submission stage 202 notifies the owner of its dependent stage, i.e., the code review stage 204. The notification enables the owner of the code review stage 204 to start reviewing the submitted source code. Consequently, the status 214 of the code review stage 204 changes from "waiting" to "active."

Figure 4:
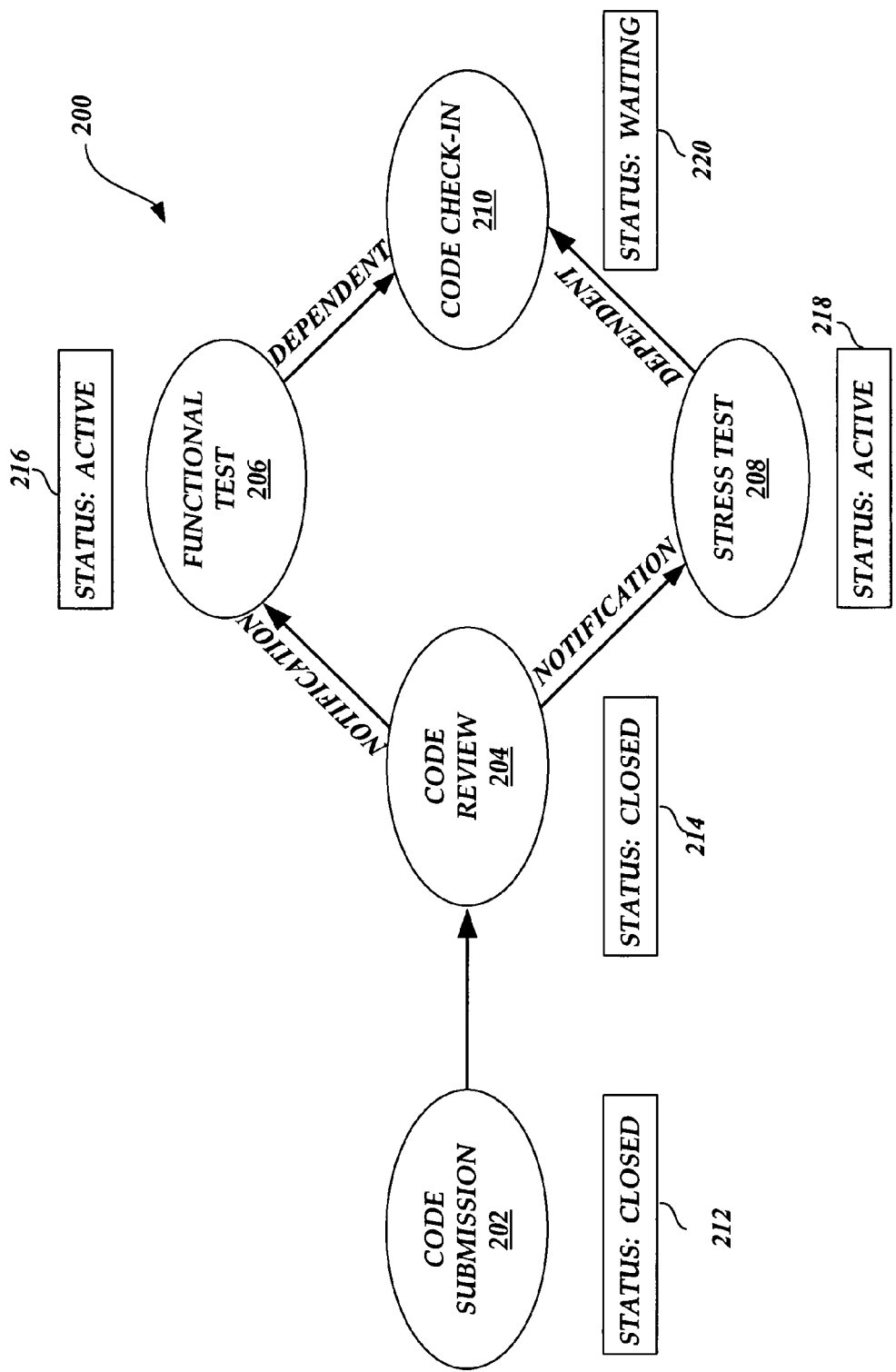
FIG. 4 is a block diagram illustrating yet another snapshot during the execution of the exemplary process used in FIG. 2, wherein the execution of the exemplary process proceeds to further stages.

The owner of the code review stage 204 reviews the submitted source code and signs off upon completing the code review. Consequently, as illustrated in FIG. 4, the status 214 of the code review stage 204 changes from "active" to "closed." Notifications are sent to the dependent stages of the code review stage 204, i.e., the functional test stage 206 and the stress test stage 208. As a result, the status 216 of the functional test stage 206 and the status 218 of the stress test stage 208 change from "waiting" to "active."

Figure 5:
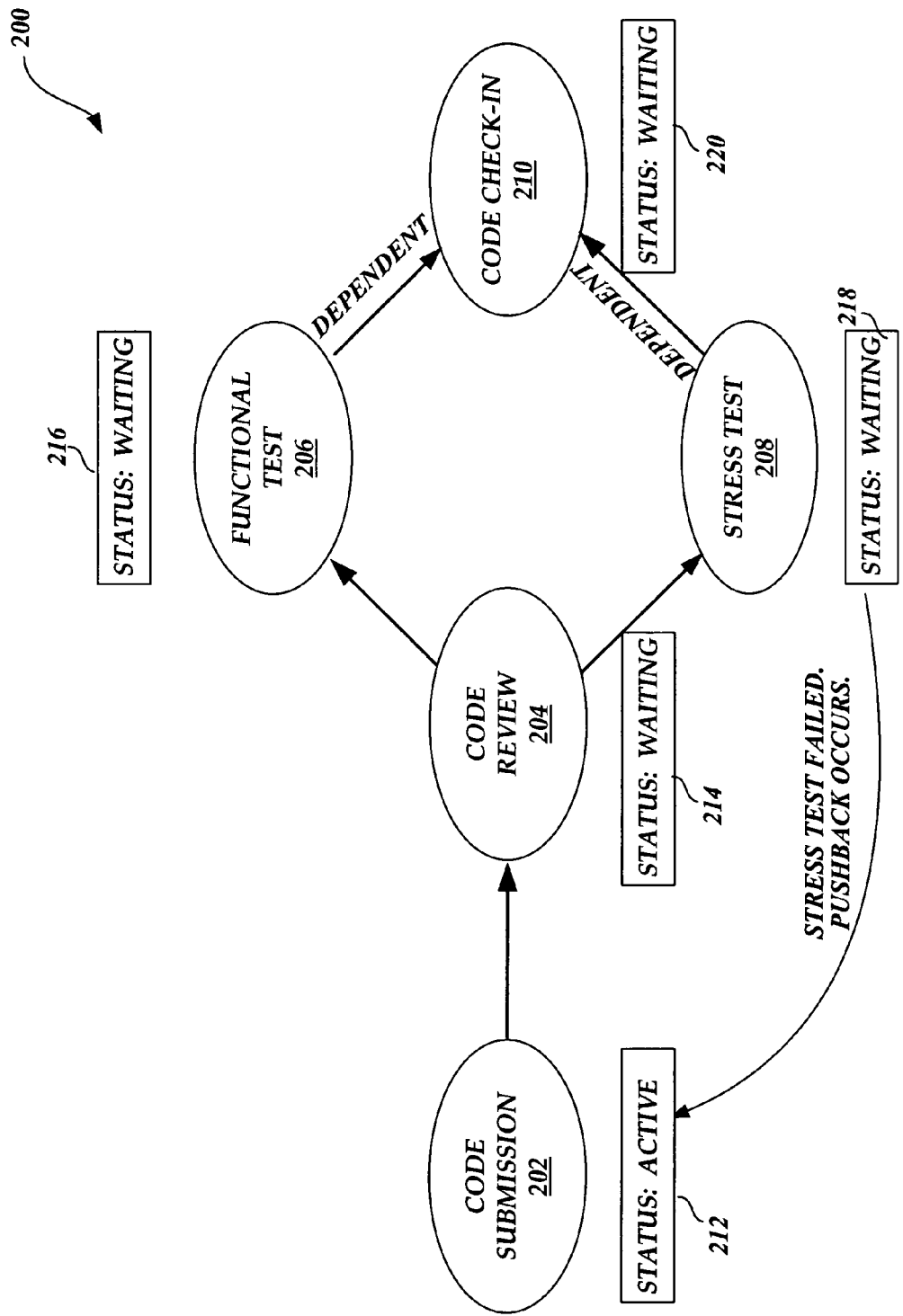
FIG. 5 is a block diagram illustrating yet another snapshot during the execution of the exemplary process used in FIG. 2, wherein the execution of the exemplary process is re-initiated.

In an exemplary embodiment of the invention, an action named "Pushback" occurs when a stage cannot be executed properly. A Pushback action resets the failed stage and reactivates the initial stage of the process. For example, as shown in FIG. 5, while the functional test stage 206 may execute successfully, the stress test stage 208 has failed. The owner of the stress test stage 208 initiates a Pushback action, which resets the status 218 of the stress test stage 208 to "waiting" and reactivates the initial stage of the test process 200, i.e., the code submission stage 202, whose status 212 thus becomes "active." Consequently, all the other stages in the test process 200 assume the "waiting" status.

Section 2: Customization of a Stage

Exemplary embodiments of the invention allow a stage in a process to be customized according to the needs of the process. One such embodiment of the invention defines various stage types. A stage type provides a generic definition of a stage. Each specific instance of a stage type is called a stage or a stage instance. For example, the code submission stage 202 (FIG. 2) is of a stage type "Code Review," which defines default behaviors for any stage of the stage type "Code Review." A user can customize a stage of a specific stage type through the use of one or more custom plug-ins, which contain the details of customization. In some embodiments of the invention, such custom plug-ins are called dynamic sub-objects. Instances of dynamic sub-objects are specific to stages in a process, but are not a direct part of a stage type. A dynamic sub-object can be referenced by a stage, for example, through referencing an identifier of the dynamic sub-object.

In an exemplary embodiment of the invention, a definition of a stage type includes a field called IsDynamicSubObject. The IsDynamicSubObject field is used to identify if an instance of the stage type includes any dynamic sub-objects. If the IsDynamicSubObject is set to be TRUE for a stage, then it means that the stage does include a dynamic sub-object. The definition of a stage type may also include a field called NameSpace, whose value identifies where the dynamic sub-object and its sub-object classes are located for an instance of the stage type. The definition of a stage type may also include a property called DynamicSubObject, through which an instance of the stage type loads the corresponding dynamic sub-object files from the location identified by the NameSpace field. In an exemplary embodiment of the invention, each dynamic sub-object includes an identifier that can be used by an instance of a stage type to reference the dynamic sub-object.

Section 3: Routines for Managing a Process Including Sequential Actions

Figure 6:
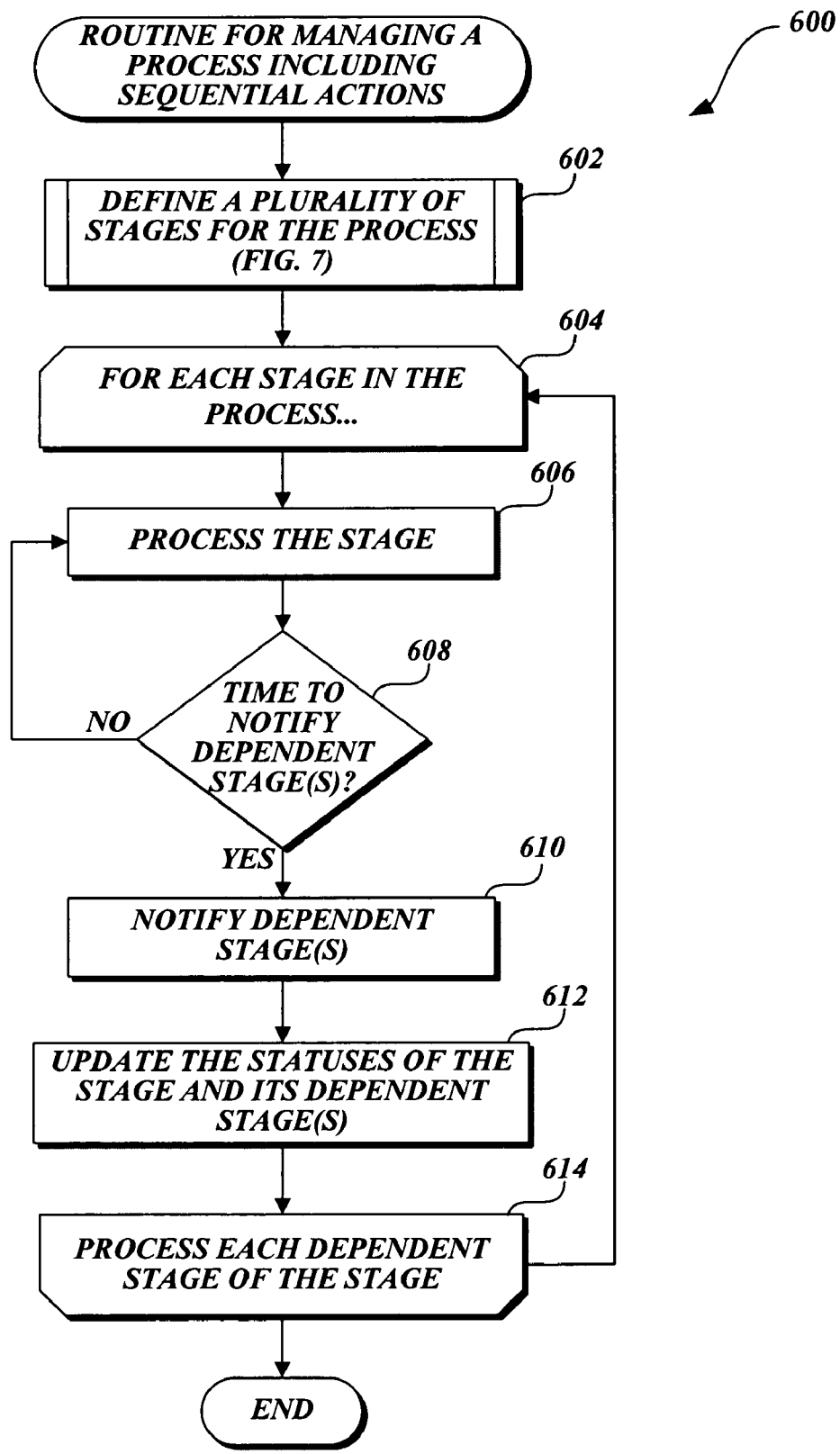
FIG. 6 is a flow diagram illustrating an exemplary routine for managing a process including sequential actions.
Figure 7:
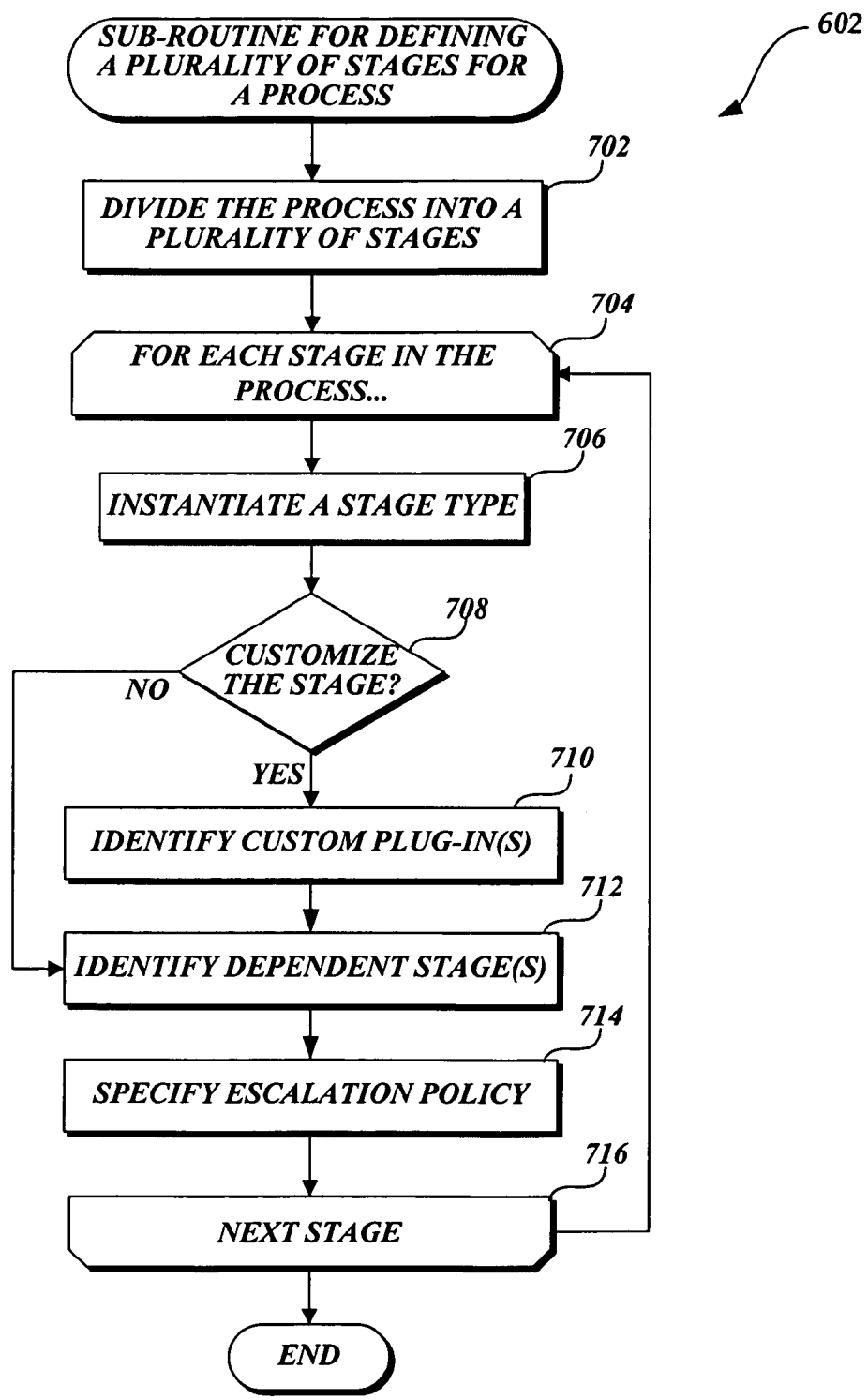
FIG. 7 is a flow diagram illustrating an exemplary subroutine for defining a plurality of stages for a process, suitable for use in FIG. 6.

FIG. 6 is a flow diagram illustrating an exemplary routine 600 for managing a process including sequential actions. The routine 600 starts by first executing a subroutine 602 that defines a plurality of stages for the process. See block 602. FIG. 7 is a flow diagram illustrating an exemplary implementation of the subroutine 602 and will be described in detail later.

After executing the subroutine 602, the routine 600 enters a "for loop" that is defined between the looping block 604 and the looping block 614. The "for loop" processes each stage in the process. At looping block 604, the above-mentioned "for loop" is commenced to iterate through each stage in the process. As such, the first stage, i.e., the initial stage of the process, is selected. The routine 600 processes the selected stage. See block 606. Here, the sequential actions contained in the stage are executed. For example, for the testing process 200 illustrated in FIGS. 2-5, software source code is submitted in the initial stage, i.e., the code submission stage 202. Upon completion of processing the selected stage, the routine 600 proceeds to determine if it is time to execute the escalation policy associated with the selected stage, e.g., whether it is time to notify the dependent stages of the selected stage. See decision block 608. As noted above, notification may be sent to dependent stages upon occurrence of a specific event for the selected stage. Such an event can be, for example, the completion of the selected stage, or a change in status of the selected stage. If the answer to decision block 608 is NO, the routine 600 loops back to block 606 to continue processing the selected stage. If the answer to the decision block 608 is YES, the routine 600 proceeds to notify each dependent stage of the selected stage. See block 610. The routine 600 then proceeds to update the status of the selected stage and those of all its dependent stages. See block 612. For example, as shown in FIG. 3, upon completion of the code submission stage 202 of the testing process 200, the status 212 of the code submission stage 202 is changed from "active" to "closed" while the status of its dependent stage, i.e., the code review stage 204, is changed from "waiting" to "active." The routine 600 then proceeds to process each dependent stage of the selected stage. See looping block 614. As those skilled in the art will appreciate, in accordance with this type of looping structure, the routine 600 either selects a stage that depends on the selected stage, if there is such a dependent stage, thereby returning to the start of the "for loop," i.e., the looping block 604, or continues execution outside of the loop. In this case, continuing beyond the "for loop" means that the routine 600 has completed its purpose, and the exemplary routine 600 terminates.

As noted above, FIG. 7 is a flow diagram illustrating an exemplary subroutine 602 that defines a plurality of stages for a process. The subroutine 602 starts by dividing the process into a plurality of stages. See block 702. The subroutine 602 then defines each stage in the process by entering a subsequent "for loop" defined between the looping block 704 and the looping block 716.

At looping block 704, the above-mentioned "for loop" is commenced to iterate through each stage in the process. For each stage, the subroutine 602 first identifies a predefined stage type and instantiates the stage type for the selected stage. See block 706. As noted above, a stage type provides a general definition for a stage. As also noted above, a stage of a particular stage type can be customized by using custom plug-ins such as dynamic sub-objects. Therefore, the subroutine 602 proceeds to determine whether to customize the selected stage. See decision block 708. If the answer is NO, the subroutine 602 proceeds to block 712 to identify stages that are dependent on the selected stage. If the answer to decision block 708 is YES, the subroutine 602 proceeds to identify the custom plug-ins. See block 710. As noted above, properties associated with the selected stage may specify the name of the custom plug-in and the location of the custom plug-in file. From block 710, the subroutine 602 proceeds to block 712 to identify each stage that depends on the selected stage. See block 712. A stage is dependent on the selected stage if the stage can be activated only after the selected stage is completed. The subroutine 602 then proceeds to specify an escalation policy for the selected stage. See block 714. As noted above, the escalation policy may specify when and how to notify dependent stages of the selected stage. The subroutine 602 then proceeds to the looping block 716, where the end of the "for loop" is reached. At looping block 716, the subroutine 602 either selects another stage in the process, if there is another stage to be processed, thereby returning to the start of the "for loop," i.e., the looping block 704, or continues execution outside of the loop. In this case, continuing beyond the "for loop" means that subroutine 602 has completed its purpose, and the exemplary subroutine terminates.

Section 4: User Interface for Defining a Plurality of Stages for a Process

Figure 8:
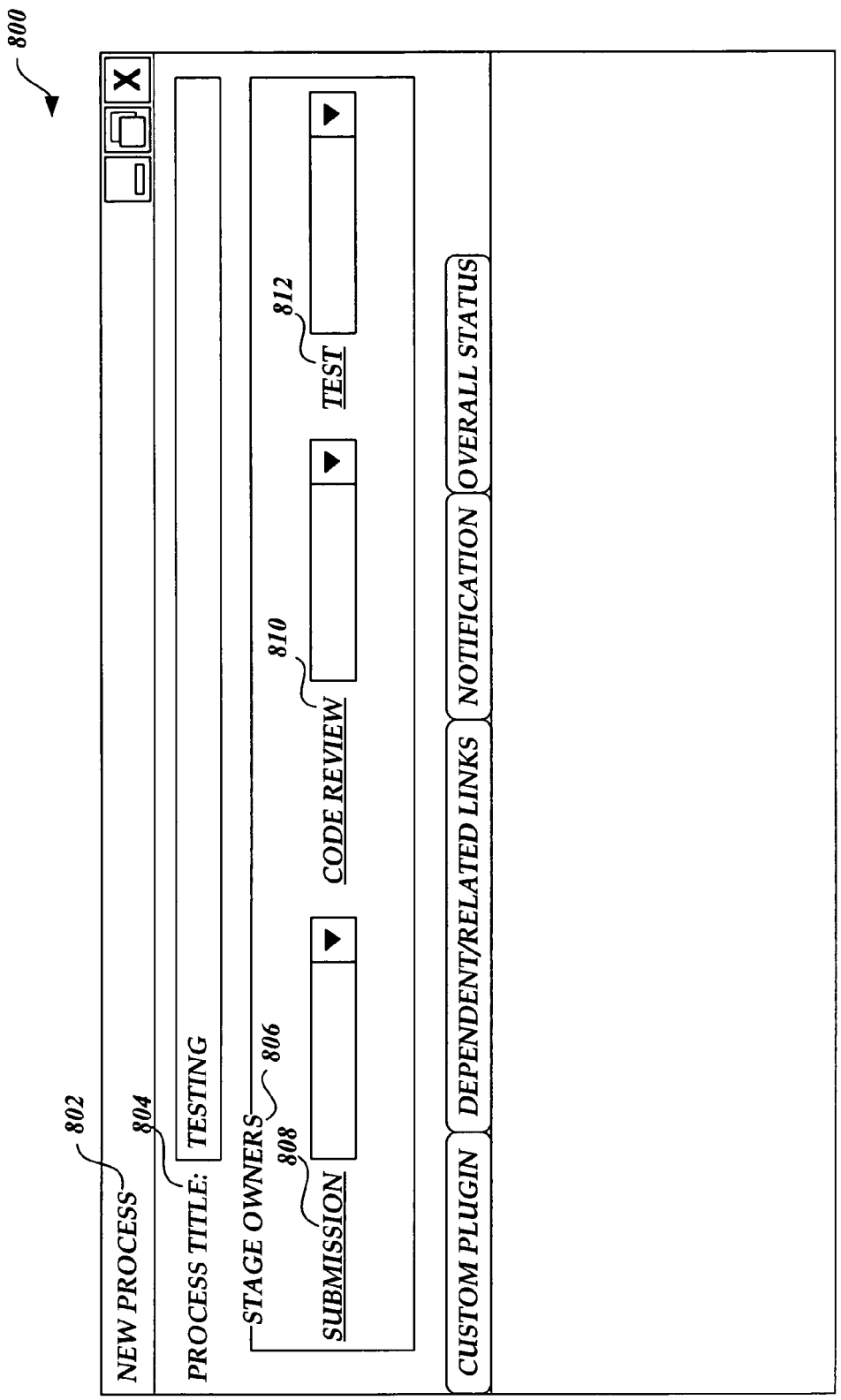
FIG. 8 is a pictorial diagram illustrating an exemplary user interface for defining a plurality of stages for a process.
Figure 10:
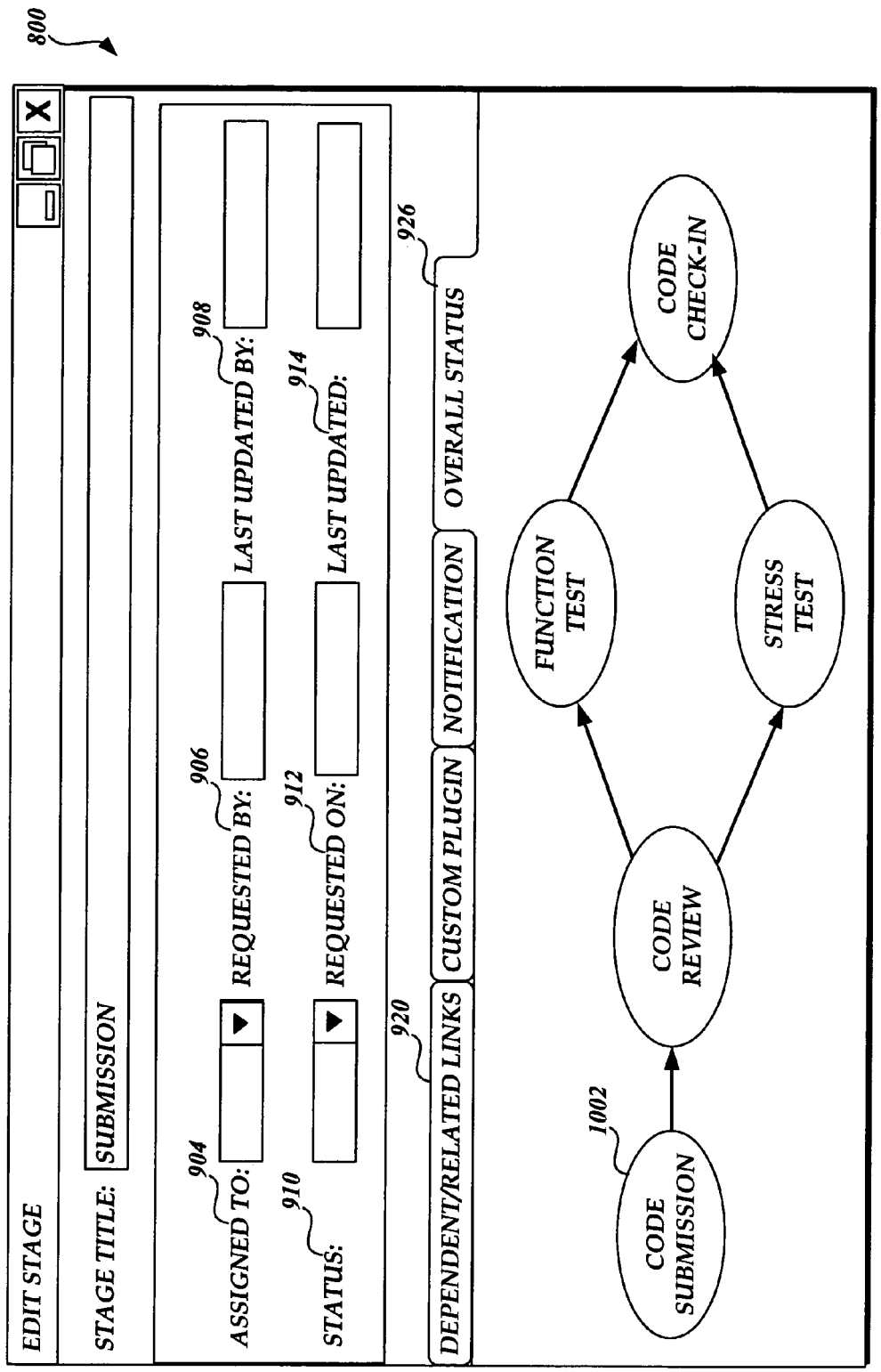
FIG. 10 is a pictorial diagram illustrating the exemplary user interface in FIG. 8, wherein all stages in a process are graphically displayed.

Embodiments of the invention may also provide a user interface, through which a user can create and manage a plurality of stages for a process. The user interface displays definitions for each individual stage in a separate section. The user interface also graphically indicates the status of each stage in a process at a given moment. FIGS. 8-10 are pictorial diagrams illustrating an exemplary user interface 800 for creating and managing a plurality of stages of a process.

FIG. 8 is a pictorial diagram illustrating the user interface 800, wherein a process 802 including a plurality of stages is created. A title 804 identifies the name of the process 802. For example, as shown in FIG. 8, the title 804 identifies the process 802 to be a testing process. The user interface 800 also displays a UI control 806 named "Stage Owners." The Stage Owners UI control 806 identifies the owner of each stage in the new process 802. For example, as shown in FIG. 8, the process 802 may contain a submission stage 808, a code review stage 810, and a test stage 812. A dropdown text box is provided for each of the stages so that a user can select one or more owners for each of the stages. In an exemplary embodiment of the invention, the Stage Owners UI control 806 is a process-specific plug-in. Thus, the Stage Owners UI control 806 can be customized for each process. In some embodiments of the invention, the user interface 800 provides a New Stage page (not shown) that allows a user to specify the name of each stage in a process and/or the stage type of the stage.

FIG. 9 is a pictorial diagram illustrating the user interface 800 when a user edits a stage in a process, such as the process 802 illustrated in FIG. 8. As shown in FIG. 9, the user interface 800 identifies the title 902 of the stage. For example, FIG. 9 shows that the title 902 of the stage being edited is Submission. The user interface 800 also identifies properties associated with the stage being edited. For example, as shown in FIG. 9, the Submission stage is associated with stage properties such as Assigned To 904, Requested By 906, Last Updated By 908, Status 910, Requested On 912, and Last Updated 914.

In embodiments of the invention, the user interface 800 for each stage also includes multiple UI sections for further configuring a stage. For example, as shown in FIG. 9, the user interface 800 includes a "dependent/related links" section 920. The "dependent/related links" section 920 allows a user to identify dependent stages of the stage being edited. The "dependent/related links" section 920 also allows a user to identify any related issues that the stage being edited may have. For example, the "dependent/related links" section 920 for the code submission stage 202 illustrated in FIGS. 2-5 may identify its dependent stage, i.e., the code review stage 204. The user interface 800 may also contain a "custom plug-in" section 922 that identifies any dynamic sub-objects used by the stage being edited. The user interface 800 may also provide a Notification section 924. The Notification section 924 allows a user to specify how to notify dependent stages of the stage being edited. For example, the Notification section 924 can specify that a notification will be sent when the stage being edited has transitioned into the "closed" status. The Notification section 924 can also identify who will receive the notification.

In embodiments of the invention, the user interface 800 may also include an "overall status" section 926. The "overall status" section 926 graphically illustrates the stage being edited relative to other stages in the process that the stage being edited is in. FIG. 10 illustrates an exemplary implementation of the "overall status" section 926. For example, the "overall status" section 926 graphically displays that the process consists of a code submission stage, a code review stage, a functional test stage, a stress test stage, and a code check-in stage. The "overall status" section 926 also reveals the dependency among the stages, using the information provided in the "dependent/related links" section 920 for each stage. For example, the code submission stage 1002 does not have any dependency and is thus displayed as the initial stage in the process. In an exemplary embodiment of the invention, each stage identified in the "overall status" section 926 may be colored differently to reflect the stage's current status. For example, green indicates a "closed" status; blue indicates a "waiting" status; yellow indicates an "active" status; and orange indicates a "resolved" status.

While the preferred embodiment of the invention has been illustrated and described, it will be appreciated that various changes can be made therein without departing from the spirit and scope of the invention.

The invention claimed is:

1. A computer-implemented method for managing a process including sequential actions, comprising:
    dividing the process into a sequence of stages, wherein each stage in the sequence of stages includes a plurality of sequential actions and an escalation policy specifying how to notify each dependent stage of the stage upon occurrence of a particular event in the stage, including specifying whether and when to notify each dependent stage;
    defining dependency among the sequence of stages, wherein a second stage is a dependent stage of a first stage if the second stage can only be executed after the first stage, and wherein a stage is an initial stage of the sequence of stages if the stage depends on no other stages in the process;
    customizing the stages, including specifying an owner of the stage and a stage type of the stage, each stage type being associated with a dynamic sub-object used to customize the stage; and
    executing the stages in sequence, wherein executing the stages includes
        (a) executing a current stage in the sequence of stages;
        (b) re-executing all stages in the sequence of stages, if the current stage is not successfully executed;
        (c) setting a dependent stage as a new current stage if the current stage is successfully executed and repeating (a)-(c) for each dependent stage of the current stage.

2. The computer-implemented method of claim 1, wherein each stage in the process includes a property indicating a status of the stage, wherein the status of the stage changes according to progression of the process.

3. The computer-implemented method of claim 2, wherein the status of a stage is any one of the group consisting of "active," "waiting," "resolved," and "closed," wherein the status of the stage is "active" when the stage is being executed, is "waiting" when the stage has not been executed, and is "resolved" if each issue in the stage is resolved but not verified, is "closed" if the stage has been successfully executed.

4. The computer-implemented meted of claim 1, wherein each stage in to process includes a property indicating to owner of the stage, wherein the owner of the stage takes responsibility fur proper execution of the stage.

5. The computer-implemented method of claim 1, wherein each stage in the process is an instance of the stage type.

6. The computer-implemented method of claim 5, wherein customizing the stages includes customizing the instance of the stage type, the stage type including a property indicating whether an instance of the stage type includes one or more plug-ins for customizing the instance of the stage type.

7. The computer-implemented method of claim 1, wherein customizing the stages further includes specifying a name of the stage.

8. The computer-implemented method of claim 1, wherein customizing the stages further includes specifying dynamic sub-objects used by the stage.

9. A computer-readable medium having computer-executable instructions thereon for implementing a method for managing a process including sequential actions, comprising:
    dividing the process into a sequence of stages, wherein each stage includes a plurality of sequential actions and an escalation policy specifying how to notify each dependent stage of the stage upon occurrence of a particular event in the stage, including specifying whether and when to notify each dependent stage;
    defining dependency among the sequence of stages, wherein a second stage is a dependent stage of a first stage if the second stage can only be executed after the first stage, and wherein a stage is the initial stage of the sequence of stages if the stage depends on no other stages in the process;
    customizing the stages, including specifying an owner of the stage and a stage type of the stage, each stage type being associated with a dynamic sub-object used to customize the stage; and
    executing the stages in sequence, wherein executing the stages in sequence includes
        (a) executing a current stage, in the sequence of stages;
        (b) re-executing all the stages in the sequence of stages, if the stage is not successfully executed; and
        (c) setting a dependent stage as a new current stage if the current stage is successfully executed and repeating (a)-(c) for each dependent stage of the current stage.

10. The computer-readable medium of claim 9, wherein each stage in the process includes a property indicating a status of the stage, wherein the status of the stage changes according to progression of the process.

11. The computer-readable medium of claim 9, wherein each stage in the process includes a property indicating the owner of the stage, wherein the owner of the stage takes responsibility for proper execution of the stage.

12. The computer-readable medium of claim 9, wherein each stage in the process is an instance of the stage type.

13. The computer-readable medium of claim 12, wherein customizing the stages includes customizing the instance of the stage type, the stage type including a property indicating whether an instance of the stage type includes one or more plug-ins for customizing the instance of the stage type.

14. The computer-readable medium of claim 9, wherein customizing the stages further includes specifying at least one of a name of the stage and dynamic sub-objects used by the stage.

* * * * *

UNITED STATES PATENT AND TRADEMARK OFFICE
CERTIFICATE OF CORRECTION

| | | |
|---|---|---|
| PATENT NO. | : 7,418,306 B2 | Page 1 of 1 |
| APPLICATION NO. | : 11/069854 | |
| DATED | : August 26, 2008 | |
| INVENTOR(S) | : Sivaprasad V. Padisetty et al. | |

It is certified that error appears in the above-identified patent and that said Letters Patent is hereby corrected as shown below:

In column 9, line 58, in Claim 4, delete "meted" and insert -- method --, therefor.

In column 9, line 59, in Claim 4, delete "to" and insert -- the --, therefor.

In column 9, line 59, in Claim 4, after "indicating" delete "to" and insert -- the --, therefor.

In column 9, line 61, in Claim 4, delete "fur" and insert -- for --, therefor.

Signed and Sealed this
Third Day of May, 2011

David J. Kappos
*Director of the United States Patent and Trademark Office*